(No Model.) 2 Sheets—Sheet 2.
L. P. HALLADAY.
BICYCLE.
No. 451,428. Patented Apr. 28, 1891.
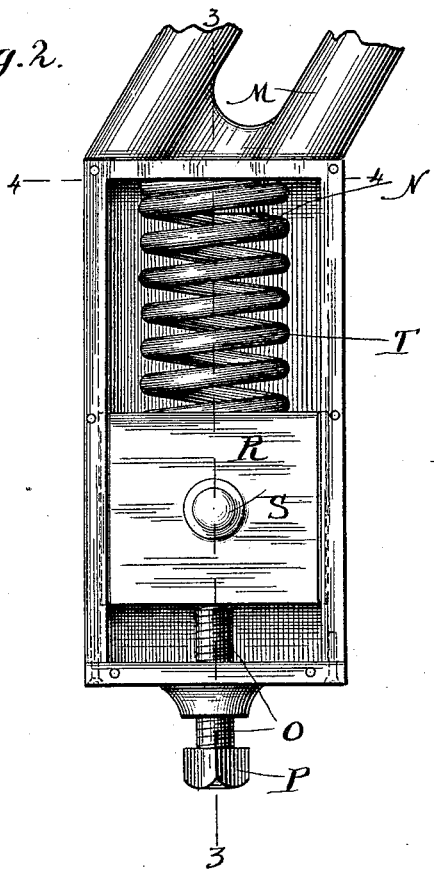
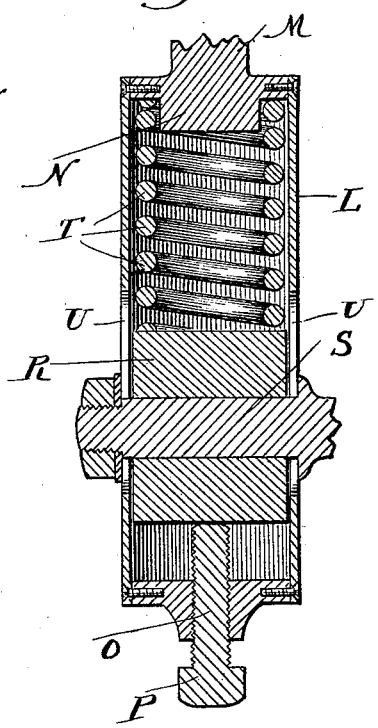
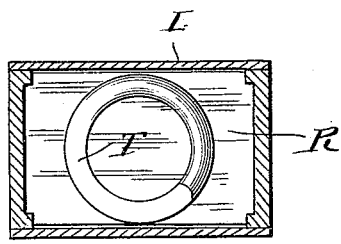
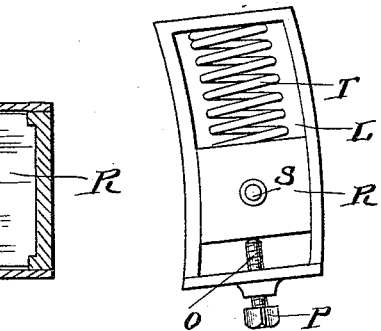
Witnesses:
Celeste P. Chapman.
Jean Elliott.
Inventor:
Lewis P. Halladay.
Francis W. Parke
Attorney.

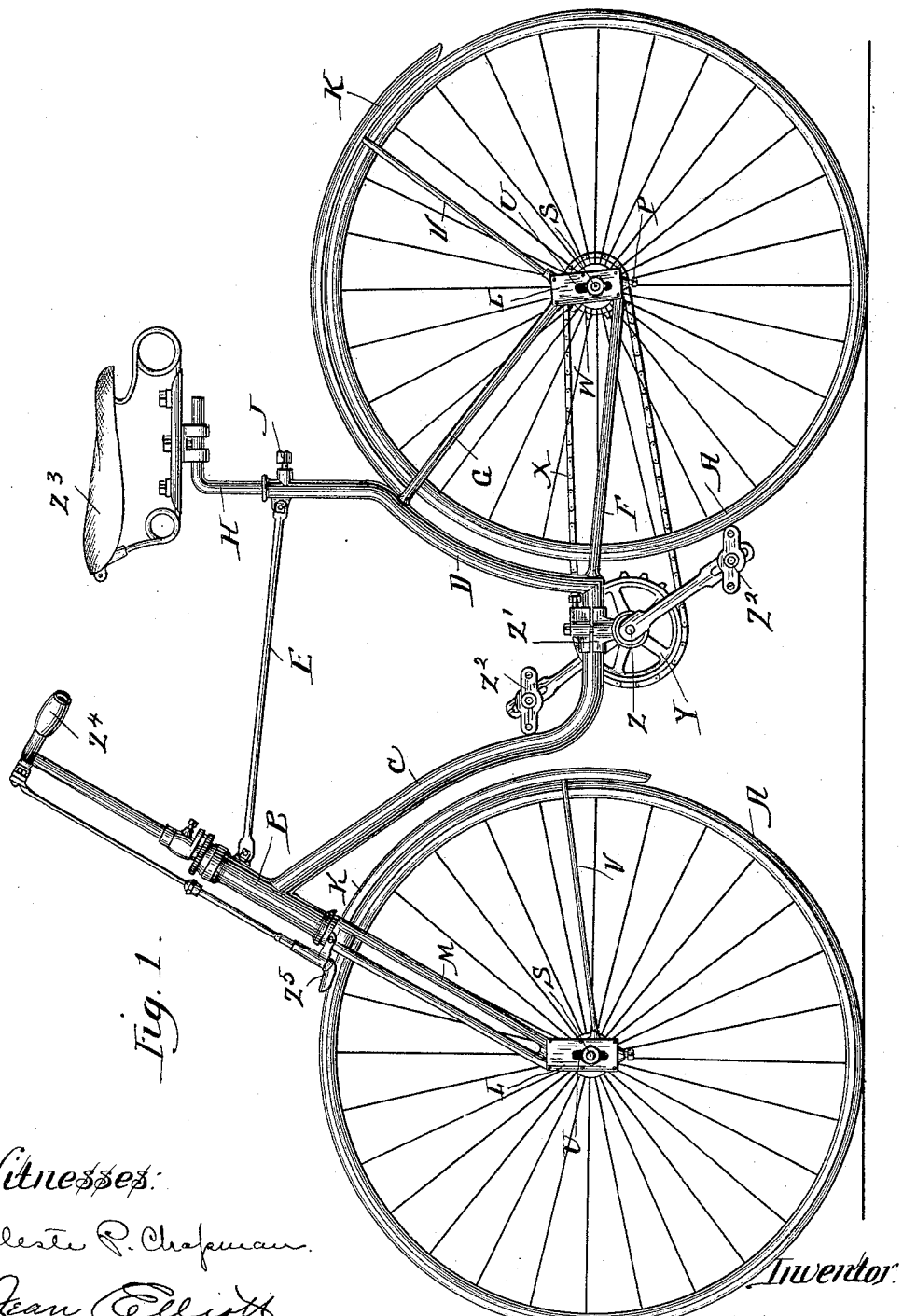

UNITED STATES PATENT OFFICE.

LEWIS P. HALLADAY, OF CHICAGO, ILLINOIS, ASSIGNOR OF TWO-THIRDS TO WILLIAM H. HALLADAY AND WILLIAM E. HALLADAY.

BICYCLE.

SPECIFICATION forming part of Letters Patent No. 451,428, dated April 28, 1891.

Application filed September 15, 1890. Serial No. 365,007. (No model.)

*To all whom it may concern:*

Be it known that I, LEWIS P. HALLADAY, a citizen of the United States, residing at Chicago, in the county of Cook and State of Illinois, have invented a new and useful Improvement in Bicycles, of which the following is a specification.

My invention relates to bicycles, and has for its object to provide a simple and inexpensive bicycle and frame, as illustrated in the accompanying drawings, wherein—

Figure 1 is a side view of the bicycle. Fig. 2 is a view of one of the forward boxes with side removed. Fig. 3 is a vertical section through the opposite boxes on the line 3 3. Fig. 4 is a cross-section plan view on the line 4 4. Fig. 5 is a detailed modification.

Like parts are indicated by the same letter in all the figures.

A A are the wheels, made in any desired manner.

The frame is composed of the sections B, C, D, E, F, G, and H. These sections constitute, when put together, one continuous frame, the section H being adjustably secured by the set-screw J, and the section E serving as a sort of link connecting the sections B and D. K K are the guards suitably secured on these frame-pieces.

L L are forward boxes on opposite sides of the wheel A. These boxes are secured to the frame-piece B by the arms M M on opposite sides of the wheel. Each box is composed of a rectangular case with sides, which sides are removable. Depending from the top of the box is the base N, and projecting upward from the bottom of each box is the screw-bolt O, having the nut P at its lower end.

Within each box, and adapted to vertically reciprocate therein, is a block R, through which passes the end of the axle S and upon which rests the spiral spring T, the upper end of which receives the base N. Each side of the box has a slot U U, through which projects the axle S, and thus it will be seen that the block R, which carries the end of the axle, is adjustably supported by the arms V V. The arms V, F, and G are of course in duplicate and the wheel placed between them in the usual manner. The boxes for the rear wheel A are precisely the same as those for the forward wheel, and hence the foregoing description suffices for both. The rear boxes, however, are set at an angle to the vertical line, or so that they shall be placed tangentially to a circle, the center of which is the center of rotation of the pedals.

W is a sprocket-wheel on the rear axle; X, the chain therefrom, which passes around the sprocket-wheel Y, which is secured on the short shaft Z, which is journaled in the boxing Z'. To this shaft is also secured the pedals $Z^2$ $Z^2$.

$Z^3$ is the seat supported in any usual manner; $Z^4$, the handle, and $Z^5$ the brake.

In the modification the interior of the rear boxes, as shown, has a groove concentric with the center of rotation of the pedals, and the block which holds the axle is adapted to slide therein, and the slots in the side of the side plates of the boxes are also arc-shaped.

Clearly changes in the positions and relations of some of the parts could be made without departing from the spirit of my invention.

The use and operation of my invention are as follows: It will be observed that the weight of the rider, together with the weight of the frame of the machine, is supported upon the wheels by means of the intervening elastic springs T T, which are interposed between the frame proper and the blocks in which the axles are secured. If now the machine pass over obstructions or obstacles or inequalities in its track, the wheel which engages such obstructions will rise slightly against the elastic spring T, and its motion, or the motion of such inequality, will be taken up by such spring, and hence will not be communicated in any considerable degree to the body of the rider. This is the action whether either or both of the wheels are passing over obstructions. Moreover, such motion of the wheels will not affect the distance of the rider from the pedals or otherwise interfere with his operating the machine. When the rear wheel rises in this manner, it will slightly vary its position with reference to the center of rotation of the pedals, and hence would have a tendency to shorten the chain X, or rather to lengthen the distance between the two sprocket-wheels. If in the form of machine shown the box L in the rear wheel should be placed upright, this action would materially interfere with the operation of the machine. By placing the box at an angle to the vertical line the motion of the axle of the wheel as it rises and falls will be tangential to a circle from the center of the sprocket-wheel Y, and hence the variation of distance between the centers of the rear wheel A and the sprocket-wheel Y will be trifling. In any case this variation can be entirely obviated by making the blocks in which the rear axle is fixed move through an arc the center of which is the center of the sprocket-wheel Y, as indicated in Fig. 5. Of course the angle of inclination of the rear blocks L L and the position and curvature of the arc, if used, would vary according to the relative positions of the sprocket-wheels.

Having thus described my invention, what I claim, and desire to secure by Letters Patent, is as follows:

1. In a bicycle, the combination of an upper frame with boxes secured to the front and rear thereof, blocks within such boxes capable of reciprocating therein, wheels whose axles are supported in such blocks, elastic cushions in said boxes above such blocks, and adjustable rigid supports for such blocks in the bottom of such boxes, said boxes entirely inclosing such springs.

2. In a bicycle, the combination of an upper frame with a driving-wheel, driving-treadles, driving-chain, and sprocket-wheels connecting such wheel-axle with the treadles, an elastic cushion interposed between such wheel-axle and the frame, and a curved guide in which such wheel-axle moves, the curvature thereof concentric with the center of rotation of the treadles.

LEWIS P. HALLADAY.

Witnesses:
CELESTE P. CHAPMAN,
JEAN ELLIOTT.